March 5, 1957 R. M. BLOCK ET AL 2,784,063
BROMINE PRODUCTION
Filed Jan. 27, 1953
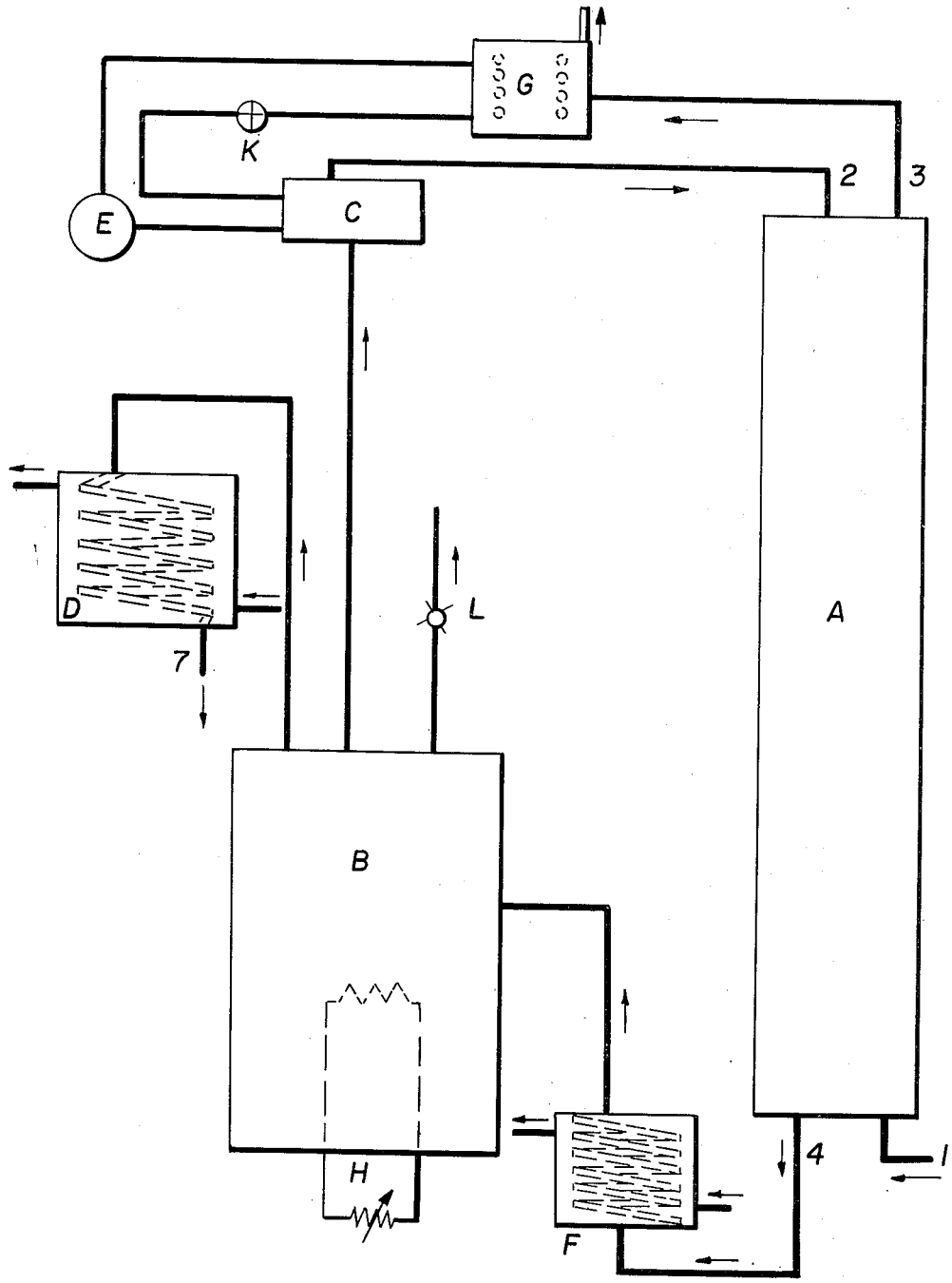
MOSHE RUDOLPH BLOCH
FAIVEL YARON         Inventors
By    L. F. Marx     Attorney

United States Patent Office 2,784,063
Patented Mar. 5, 1957

2,784,063

BROMINE PRODUCTION

Rudolph Moshe Block and Faivel Yaron, Jerusalem, Israel

Application January 27, 1953, Serial No. 333,489

6 Claims. (Cl. 23—218)

This invention relates to the manufacturing of bromine from mixtures of bromine vapour and air, or bromine vapour and other indifferent gases, such as are obtained by blowing out bromine by means of air from chlorinated bromide containing brines.

One of the conventional ways by which bromine is recovered from such mixtures is to absorb the bromine from the gaseous mixture by an alkaline solution. The reactions involved may be expressed summarily by the following equations:

1.  $6NaOH + 3Br_2 = 5NaBr + NaBrO_3 + 3H_2O$

1a. $3Na_2CO_3 + 3Br_2 = 5NaBr + NaBrO_3 + 3CO_2$

When the solution becomes partly or wholly saturated with bromine, the solution is removed from the absorption vessel and the bromine is set free by acidification, e. g. with sulphuric acid. The process of bromine liberation may be represented by the following equation:

2. $5NaBr + NaBrO_3 + 3H_2SO_4 = 3Na_2SO_4 + 3Br_2 + 3H_2O$

Part of the liberated bromine may precipitate and part of it may remain dissolved in the sodium sulphate solution, having to be separated from this solution by distillation.

The disadvantage of the above described way of recovery of bromine from the gaseous mixture is the necessity of using alkali and acid.

Another well known way to recover bromine from the gaseous mixture is to react the latter with sulphur dioxide in the presence of water and to absorb the hydrogen bromide thus obtained by an alkaline solution. The reactions occurring may be described by the following equations:

3.     $Br_2 + SO_2 + 2H_2O = 2HBr + H_2SO_4$

4.     $2HBr + 2NaOH = 2NaBr + 2H_2O$ or

4a.    $2HBr + NA_2CO_3 = 2NaBr + H_2O + CO_2$

In this way a sodium bromide solution is obtained from which the bromine is set free by chlorination.

The disadvantage of this way of recovery of bromine is that alkali, sulphur dioxide and chlorine have to be used.

It is an object of this invention to overcome these disadvantages and to provide improvements in a process which enables the recovery of bromine from gaseous mixtures of bromine vapour and air, or other inert gases, substantially without the use of alkali, acid or chlorine.

This invention consists in a process for extracting bromine from vapour mixtures containing bromine vapour and air (hereinafter referred to as "bromine-air"), or bromine vapour and other inert gas, such as are obtained by blowing air concurrently or countercurrently through bubble towers or packed towers through which bromine containing chlorinated brines (hereinafter referred to as "incoming brines") are circulated, wherein the bromine is absorbed by a cooled aqueous solution of hydrobromic acid or one or more metal- (including ammonium) bromides (hereinafter referred to as "absorbing brine") which brine may additionally contain minor quantities of hypobromite, bromate or free alkali. The metal bromide may be an alkali bromide-, or an earth alkali bromide-, an iron bromide-, or an ammonium bromide solution, or a solution of an alkyl- or aryl-ammonium bromide, these solutions being cooled to ordinary or even lower temperatures, and the absorbed bromine is later recovered by heating the bromine saturated brines.

The invention is based on the fact that bromine reacts with bromide to form poly-bromides which are addition compounds of elementary bromine with ionic bromides. These poly-bromides have a bromine vapour pressure substantially below the vapour pressure of liquid or solid bromine. The cooled bromine solution dissolves bromine with formation of poly-bromides, thus causing a considerable decrease of the bromine vapour pressure of the system. By heating again the poly-bromides are dissociated into bromides and free bromine, thus causing a rise in bromine vapour pressure and subsequent volatilisation of bromine.

These poly-bromide solutions are substantially liquid at all temperatures which are suitable for absorption and dissociation providing in this way easy possibility for heat exchange. The heat exchanger advantageously may be made of glass, but metal (like lead and silver) or carbon heat exchangers are also possible, because at low temperatures the corrosive action of bromine is reduced, which is another advantage of this process.

The heat exchange can be effected by cooling the condenser of a refrigeration unit directly or indirectly with an auxiliary circulating brine.

The accompanying drawing is a diagrammatic view of the apparatus used for the process in which:

A is an absorption tower,
B is a still,
C shows the evaporator of the refrigeration unit,
D is the bromine condenser,
E represents the compressor of the refrigeration unit,
F shows the heat exchanger,
G is the condenser of the refrigeration unit,
H is a heating element,
K a reduction valve, and
L a vacuum line.

Referring now to the diagram, at (1) 4000 cubic meters of air, containing 2–3% bromine at about +35° C., from a conventional bromine stripping tower, enters the absorption tower A from the bottom; 4 cubic meters of an absorbing brine, consisting of an aqueous solution containing 350 g. of sodium bromide per liter, and cooled to −15° C. by indirect heat exchange with a vaporizable refrigerant in evaporator C of the refrigeration unit is run into absorption tower A in countercurrent (2) to the incoming bromine-air. The bromine vapours are absorbed in the absorbing brine and the air escapes at (3) practically debrominated and serves first to cool down the incoming air-bromine mixture in a heat exchanger (not shown) and then to cool condenser G where vaporized refrigerant is condensed after having been compressed in compressor E. The absorbing brine, saturated with absorbed bromine, having a temperature of about +10° C., is transferred to a still B—after passing through heat exchanger F for preliminary warming by contacting it therein with fresh absorbing brine. In said still B the bromine is separated from the solution by heating by means of a heating element H under ordinary or reduced pressure, the latter being obtained by a pump (not shown) provided in line L. If separation is done under reduced pressure the solution is kept cold as long as the vessel is connected with the pump, in order to reduce losses of bromine. After evacuation the solution is heated as above.

The bromine vapours are condensed in the cooled condenser D and bromine leaves at (7). The debrominated solution is recirculated to the absorption tower and serves again as absorbing brine; on its way from the still B to the absorption tower A, this brine is cooled in evaporator C of the refrigeration unit. In the above way 90% of the bromine is recovered in the form of elementary liquid bromine.

We claim:

1. A process for extracting bromine from gasiform mixtures containing bromine vapor, which comprises contacting said mixtures in an absorption stage with an aqueous bromide-containing solution cooled to about $-15°$ C. to form polybromides in said solution, removing a gasiform mixture of reduced bromine content from said stage, liberating and stripping bromine from said polybromide-containing aqueous solution by a step which consists in heating and distilling said solution, removing the liberated bromine, cooling the stripped aqueous solution to about $-15°$ C., and recycling the cooled stripped solution to the absorption stage.

2. A process according to claim 1 wherein said bromide is selected from the group consisting of alkali metal bromide, alkaline earth metal bromide, and ammonium bromide.

3. A process according to claim 2 wherein said aqueous solution contains in addition to said bromide a compound selected from the group consisting of hypobromites and bromates.

4. A process according to claim 2 wherein said aqueous solution also contains free alkali.

5. A process for extracting bromine from an air stream containing 2 to 3% bromine, which comprises: passing said air stream through an absorption stage in countercurrent contact with an aqueous solution of an alkali metal bromide cooled to about $-15°$ C. and thereby forming polybromides in said solution, removing a cool air stream of reduced bromine content from said absorption stage, liberating and stripping bromine from said polybromide-containing solution by a step which consists in heating and distilling said solution in a heating stage, removing the liberated bromine vapor from said heating stage, separately removing the stripped aqueous solution from said heating stage, cooling the removed aqueous solution to about $-15°$ C. by indirect heat exchange with a vaporizing refrigerant in a refrigerative evaporation stage, passing the cooled solution to the absorption stage, compressing said evaporated refrigerant, and condensing said compressed refrigerant by indirect heat exchange with said cool air stream removed from said absorption stage.

6. A process according to claim 5 wherein the absorbent aqueous solution being passed to the absorption stage contains about 350 grams sodium bromide per liter.

References Cited in the file of this patent

UNITED STATES PATENTS

| | | |
|---|---|---|
| 461,681 | Kautz | Oct. 20, 1891 |
| 733,467 | Dow | July 14, 1903 |
| 1,085,944 | Schaefer | Feb. 3, 1914 |
| 1,141,921 | Barstow | June 8, 1915 |
| 1,885,029 | Dressel | Oct. 25, 1932 |
| 2,143,223 | Heath | Jan. 10, 1939 |
| 2,245,514 | Williamson | June 10, 1941 |
| 2,359,221 | Kanaga | Sept. 26, 1944 |

FOREIGN PATENTS

| | | |
|---|---|---|
| 658,828 | Great Britain | Oct. 10, 1951 |

OTHER REFERENCES

J. W. Mellor's: "A Comprehensive Treatise on Inorganic and Theoretical Chemistry," vol. 2, 1922 ed., pages 83 and 84, Longmans, Green and Co., N. Y.

"Solubilities of Inorganic and Organic Compounds" by A. Seidell, 2nd ed., 2nd printing, page 159. D. Van Nostrand Co., Inc., N. Y.